United States Patent [19]

Leung et al.

[11] Patent Number: 5,610,492

[45] Date of Patent: Mar. 11, 1997

[54] METHOD AND APPARATUS FOR INDUCED POLE STEPPER MOTOR

[75] Inventors: Mankong H. Leung; Steven G. Skiver, both of Kokomo, Ind.

[73] Assignee: Delco Electronics Corporation, Kokomo, Ind.

[21] Appl. No.: 690,465

[22] Filed: Jul. 29, 1996

Related U.S. Application Data

[63] Continuation of Ser. No. 334,081, Nov. 4, 1994, abandoned.

[51] Int. Cl.⁶ .................................................. H02P 5/28
[52] U.S. Cl. .................... 318/701; 310/49 R; 318/696
[58] Field of Search .................................. 318/701, 685, 318/696; 310/49 R

[56] References Cited

U.S. PATENT DOCUMENTS

| | | | |
|---|---|---|---|
| 3,995,203 | 11/1976 | Török | 318/701 |
| 4,227,136 | 10/1980 | Roesel, Jr. | 318/701 |
| 4,584,513 | 4/1986 | Freise et al. | 318/701 |
| 4,990,843 | 2/1991 | Moren et al. | 318/701 |
| 5,097,190 | 3/1992 | Lyons et al. | 318/701 |
| 5,173,651 | 12/1992 | Buckley et al. | 318/701 |
| 5,180,960 | 1/1993 | Austermann | 318/701 |
| 5,204,604 | 4/1993 | Rodun | 318/701 |
| 5,355,069 | 10/1994 | Bohn | 318/701 |

*Primary Examiner*—Brian Sircus
*Attorney, Agent, or Firm*—Jimmy L. Funke

[57] ABSTRACT

A pair of electromagnets having ferromagnetic cores with end adjacent a toothed ferromagnetic rotor are energized to induce temporary magnetic poles in the respective rotor teeth. A drive circuit selectively applies current to each electromagnet to effect rotational force on the rotor poles. Three changes in magnet current rotate the rotor to three successive stable positions, the third position being achieved when both magnets are energized to complete one step of the motor and then poles are again induced to start another step if desired. The magnetic properties of the rotor and cores are selected to insure that the pole strength in the teeth will be retained during the changes in electromagnet current.

16 Claims, 4 Drawing Sheets

METHOD AND APPARATUS FOR INDUCED POLE STEPPER MOTOR

This is a continuation of application Ser. No. 08/334081 filed on 04 Nov. 1994, abandoned Sep. 6, 1996.

FIELD OF THE INVENTION

This invention relates to a stepper motor and particularly to a stepper motor having induced poles and a method of operating the same.

BACKGROUND OF THE INVENTION instrument clusters in motor vehicles typically use pointers driven by motors such as air core gauges. It is also known to use stepper motors for that application. Stepper motors have the advantage of better accuracy, thinner package size, lower power consumption, and lower system cost. Both air core movements and conventional stepper motors require permanent magnets. The cost of permanent magnets adds to the system cost, and magnetic variance in permanent magnets due to temperature leads to gauge inaccuracy.

Accordingly, by eliminating permanent magnets from stepper motors, the cost can be still further reduced and the magnetic variance should be reduced as well. As a further benefit, such a stepper motor might by employed in applications other than gauges. The present invention avoids the use of permanent magnets by freshly inducing magnetic poles in a rotor as needed, the magnetic strength of each pole decaying soon after the pole has been used in conjunction with a varying field to advance the rotor. The prior art contains teachings of multiple horsepower motors using induced poles in a rotor. An example of an AC synchronous motor of that type is shown in the U.S. Pat. No. 4,227,136 to Roesel, Jr. which uses a special exciter coil to "write" poles in permanent magnet material on a cylindrical rotor surface and has separate field windings for producing a field to coact with the poles. That patent does not, however, teach the application of induced poles to stepper motors or to motors having fixed pole locations on the rotor. Further, it does not teach using the field coils to induce poles in the rotor.

SUMMARY OF THE INVENTION

It is therefore an object of the invention to eliminate permanent magnets from stepper motor construction.

A stepper motor useful for instrument gauges and other applications is based on an armature or rotor of magnetizable material, electromagnets each comprising a coil and core adjacent the rotor to induce magnetic poles in local portions of the rotor and then magnetically act on the poles to rotate the rotor, and an energizing circuit to controllably operate the electromagnets to induce the poles and to magnetically attract and repel the poles to rotate the motor.

Preferably the same electromagnets are used for both functions: thus the energizing circuit is used operate the electromagnets in a pole induction phase followed by a rotation phase to execute a motor step, and repetitive operation of these phases for continued motor rotation. The induction phase may magnetize a pole only temporarily and the magnetization may soon decay after the rotation phase, provided that the pole has moved from the region of the magnetic fields. The induced pole must remain long enough to successfully carry out the rotation phase even though the electromagnets may turn off and change polarity. This requirement is met by rotor material having higher residual magnetism than the electromagnet core and/or by circuit control of the magnetic decay time in the core. Also, the presence of a pole attracting field can reinforce the magnetization to help extend the life of a pole. When a pole location is again magnetized at a later time, the polarity may be different.

The rotor has an array of spaced teeth which are selectively magnetized to become the poles. Two electromagnets have coil windings with respective cores ending adjacent the teeth to provide magnetic fields between the core ends and the teeth. In one example, the two cores have adjacent ends which are contiguous, and in other cases the adjacent core ends are separated by a space. The other ends of the cores are spaced on either side of the adjacent ends. The core ends are arranged relative to the teeth such that 1) when both coils are energized to induce poles in the teeth, at least three consecutive teeth will be magnetized with alternate polarity, and 2) when one of the coils is deenergized, the fields will be unbalanced to impose a rotational force on the rotor.

In that configuration, when both coils are energized in a sense to effect the same polarity at the adjacent ends, the three nearest teeth or poles are magnetized with alternate polarities, and the center line of the coil assembly is aligned with the center one of the three teeth thereby carrying out the induction phase. At this stage there is a balanced attraction of the poles to the core ends and the rotor is stable. The rotation phase is initiated by shutting off a first one of the electromagnets, thereby upsetting the balance of forces and causing the teeth to move toward a new stable position. The resulting rotor rotation is continued by shutting off the second one of the electromagnets and turning on the first one, but with polarity opposite to that used for induction; this moves the rotor again in the same direction until a new stable position is reached. Then the second electromagnet is reenergized with polarity opposite to that used for induction to complete the motor step whereby the rotor is advanced by one tooth. Then the centerline of the cores is aligned with another center one of three teeth. This concludes the rotation phase, one of the poles being moved beyond the range of the electromagnet and being allowed to decay in magnetic strength, and another tooth being moved into close relationship with a core end. The last rotation step with both electromagnets energized overlaps with the next induction phase since both electromagnets are used to induce poles and the teeth are suitably positioned for inducing poles. Then another rotation phase is begun if further rotation is desired. This state is appropriate as a standby condition if no further rotation is desired since the electromagnets will hold the rotor in that position.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

The ensuing description is directed to a stepper motor for use as a gauge movement for an automotive instrument panel, but a motor using the same principles is suitable for other purposes as well. One example is a motor for controlling diverter door in an automotive heating and air conditioning system. The characteristics of such a motor are relatively low speed and lower torque at higher speeds.

Figure 1:
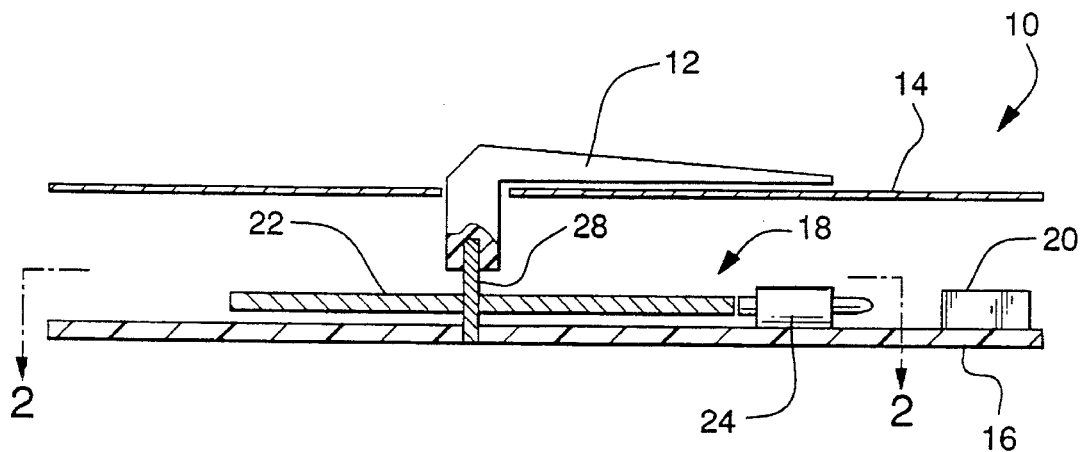
FIG. 1 is a cross section view of an automotive gauge driven by a stepper motor according to the invention.
Figure 2:
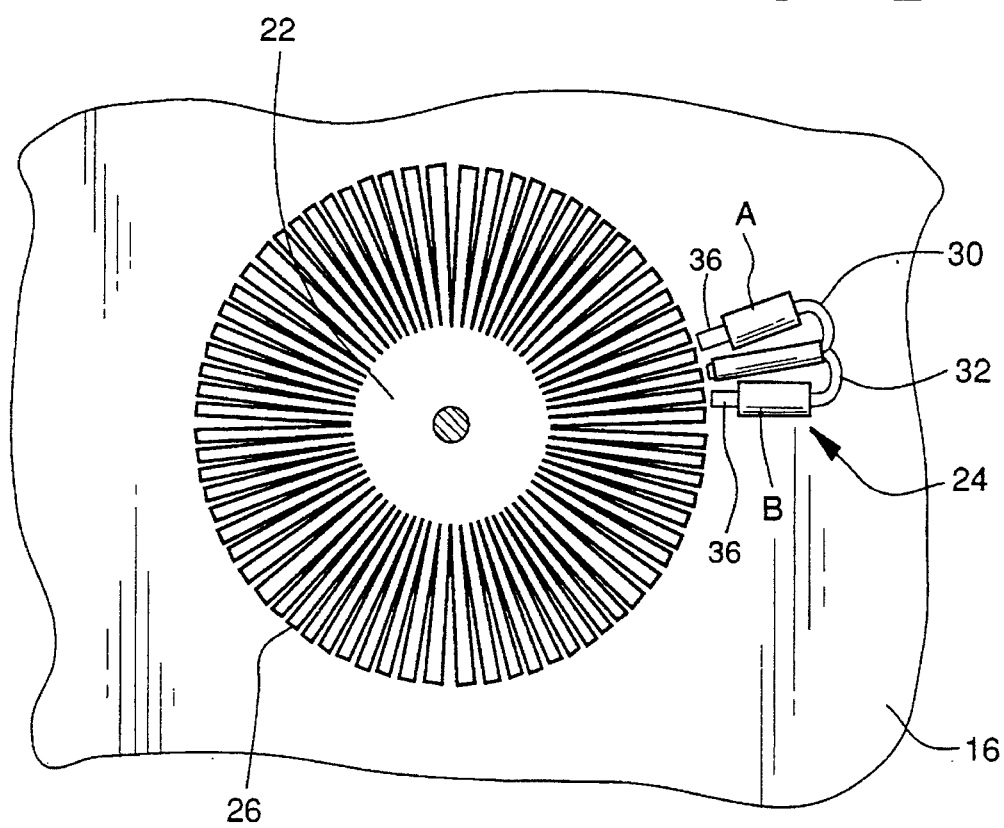
FIG. 2 is a plan view of the stepper motor of FIG. 1 taken along line 2—2.

Referring to FIGS. 1 and 2 of the drawings, an automotive instrument 10 has a pointer 12 movable in an arc across a face plate 14, a printed circuit board 16, a stepper motor 18 on the circuit board for supporting and driving the pointer 12, and a control circuit 20 on the circuit board 16 for energizing the motor to align the pointer to a value in accordance with an input parameter.

The motor 18 comprises a rotor 22 and electromagnets 24. The rotor 22 is formed of thin ferromagnetic sheet stock, say about 0.045 inch thick, and has radially extending teeth or pole pieces 26. The rotor is mounted on a spindle 28 which is supported at one end for rotation on the circuit board 20 by a bearing, not shown and carries the pointer 12 at the other end. For a rotor 22 having a diameter of an inch, the teeth 26 are about 0.25 inch long and, in this example, are square in cross section. If 32 teeth are employed the tooth pitch will be 0.098 inch, each tooth end will be 0.045 inch wide, and the space between teeth will be 0.053 inch.

The electromagnets 24 comprise a first field coil A and a second field coil B wound on respective cores 30 and 32. Each core is U-shaped and are joined together at one leg of the U to terminate at adjacent ends 34. The other ends 36 and 38 of the respective cores 30 and 32 are spaced on opposite sides of the adjacent ends 34. The core ends lie close to the path of the rotor teeth 26 so that fields developed at the cores can magnetically affect the rotor. The cores are formed from ferromagnetic rod stock 0.045 inch in diameter and are preferably round so that each core end 36 and 38 are 0.045 inch in diameter and the combined central core ends have twice that width. The outer core ends 36 and 38 are spaced at about 0.15 inch on centers, which is about 1.5 times the tooth pitch.

The materials of the rotor and the cores are chosen to have magnetic properties which optimize the operation of the motor. As will be seen, the motor operation requires that the fields developed by the coils will selectively magnetize the teeth 26 to form temporary poles and before the pole strength decays to a small value the coil current in each coil is changed to quickly reduce the field strength or reverse the core polarity to cause rotation of the rotor. Thus the core and rotor materials must have sufficiently different hysteresis characteristics to permit the several magnetic changes in the cores to complete rotor movement through at least one tooth pitch before the residual magnetism of the pole collapses. That is, the hysteresis or rate of change of field strength of the cores must be greater than the hysteresis of the rotor teeth. For example, such a motor is operational when the core material comprises tool steel and the rotor comprises cold rolled steel. The magnetism of the tool steel decays about 30% faster than the cold rolled steel, and in practice this difference is sufficient to allow the motor to work. The materials have not been selected for optimum performance and it is expected that other more suitable materials will be identified.

The sequence of drawings FIGS. 3a–3e illustrate the changes in coil energization and the effect on the rotor. The rotor teeth 26 are numbered 1, 2, 3, and 4 in sequence. Initially (FIG. 3a), assuming that the common core end 34 is opposite tooth 2, the core ends 36 and 38 will be near but offset from teeth 3 and 1, respectively. By energizing the coils A and B to produce north poles at core ends 36, 38 and a south pole at the common core end 34, the opposite polarity is induced in the respective teeth so that tooth 2 becomes a south pole and teeth 1 and 3 become north poles. An attraction is thus developed between each core end and its closest tooth and due to symmetry the forces on the rotor are balanced and the rotor is stable. The attraction forces are shown by double-ended arrows, and repulsion forces are shown by single headed-arrows. This is the induction phase of the motor operation.

Figure 3A:
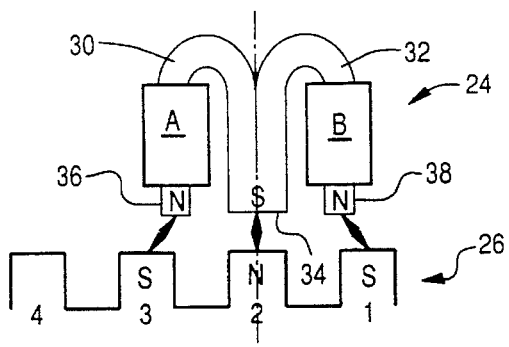
FIGS. 3a–3e are diagrams of rotor movement and coil energization for several phases of the stepper motor operation.
Figure 3B:
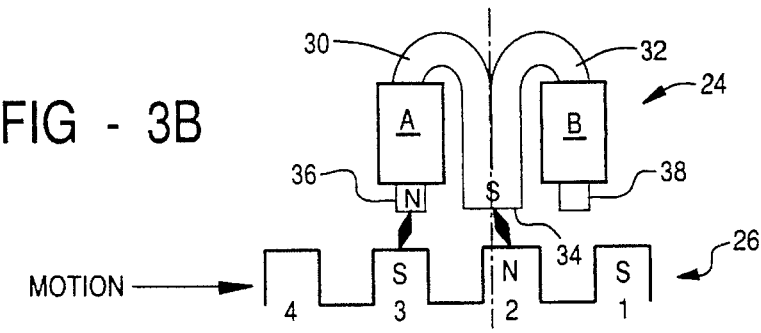
Figure 3C:
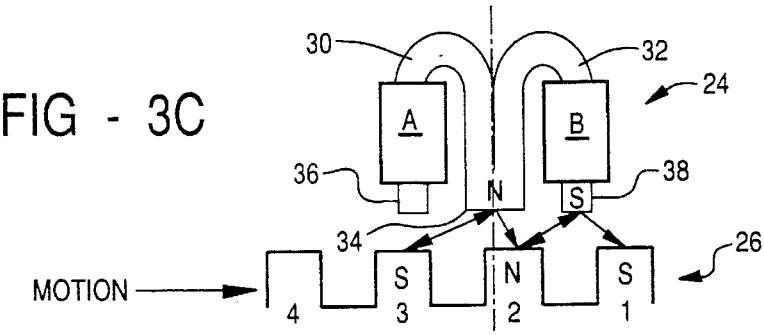
Figure 3D:
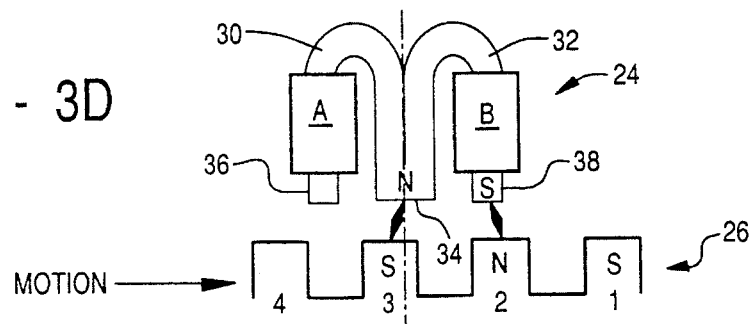
Figure 3E:
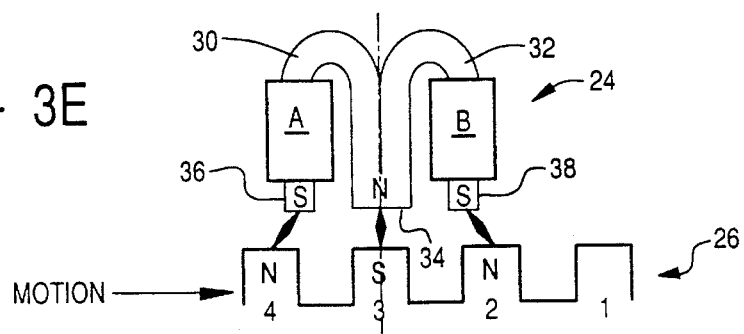

The movement phase of the motor occurs in several steps and begins by turning off the current to coil B (or to coil A, depending on the desired direction of rotation). The field in core 32 thus is permitted to decay resulting in an unbalance of forces which cause the rotor to move to a new stable position, shown in FIG. 3b, where the forces are again balanced. In the second step current to coil A is turned off and current to coil B is turned on in opposite sense to that in the induction phase to change the polarity at the pole ends 34 and 38. FIG. 3c shows the resulting attraction and repulsion forces which move the rotor to still another stable position shown in FIG. 3d. In the third step, current is applied to coil A in opposite sense to that in the induction phase to complete the move to a final stable position shown in FIG. 3e. Thus the rotor has advanced by one tooth pitch and is in the same state as in FIG. 3a except the polarities are reversed. A new induction phase begins to induce a north pole on tooth 4, and to reinforce the magnetic strength of teeth 2 and 3. The south pole on tooth 1 is allowed to decay, the diminution occurring at a rate depending on the hysteresis of the rotor material. Where continued rotation is desired, the cycle is repeated to advance the motor another step. If rotation in the opposite direction is desired, coil A is turned off first.

Figure 4A:
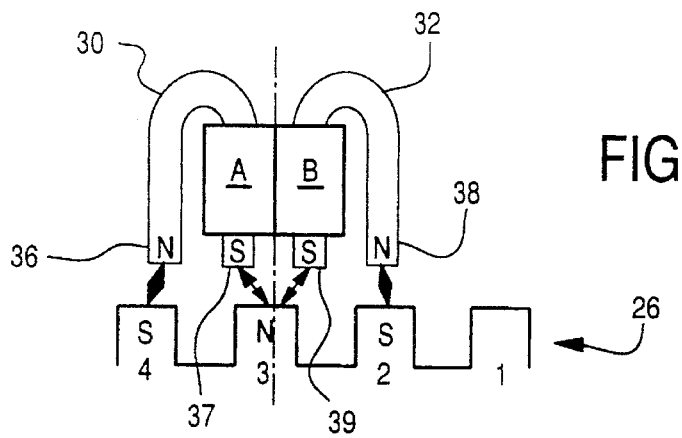
FIGS. 4a and 4b are diagrams of rotor movement and coil energization for two phases of operation for a second embodiment of stepper motor according to the invention.
Figure 4B:
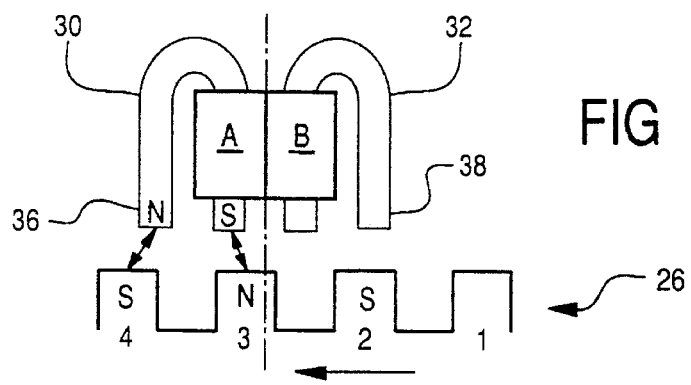

FIG. 4a shows an embodiment of the stepper motor where the center adjacent core ends 37 and 39 of cores 30 and 32, respectively, are spaced, and the total core span is nearly the same as that of three teeth. The induction phase takes place when the center line of the cores is aligned with the center one of the teeth. Then, as shown in FIG. 4b, the coil B is deenergized and the rotor moves to rebalance the forces on the rotor. In this illustration, the direction of rotation is different than that of FIG. 3b, owing to the particular geometry of the cores and the teeth.

Figure 5A:
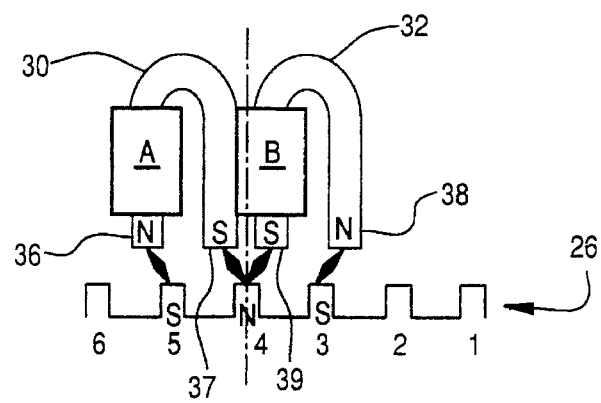
FIGS. 5a and 5b are diagrams of rotor movement and coil energization for two phases of operation for a third embodiment of stepper motor according to the invention.
Figure 5B:
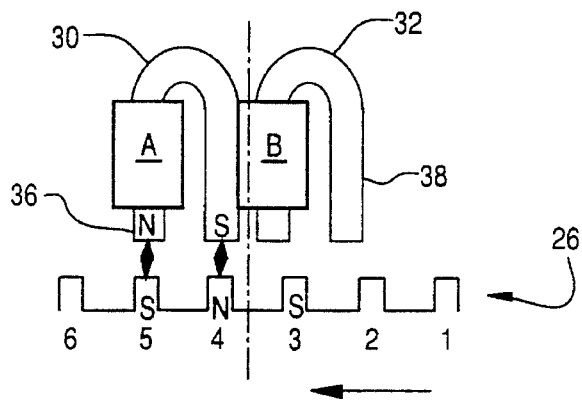

In FIG. 5a the adjacent core ends 37 and 39 are also spaced and the end spacing of each core is the same as the tooth spacing; the overall span of the core ends is somewhat greater than the span of three teeth. If desired, the end spacings of the core could be larger than the tooth spacing. The induction phase takes place when the center line of the cores is aligned with the center one of the teeth. Then, as shown in FIG. 5b, the coil B is deenergized and the rotor moves to rebalance the forces on the rotor. In this illustration, the direction of rotation is the same as that of FIG. 4b. In each embodiment, three consecutive teeth opposite the cores are magnetized with alternate polarities, and when one of the magnetizing coils is deenergized the forces are unbalanced to cause rotation of the rotor. Continues rotation occurs according to the same control sequence described for FIGS. 3a to 3e.

Figure 6:
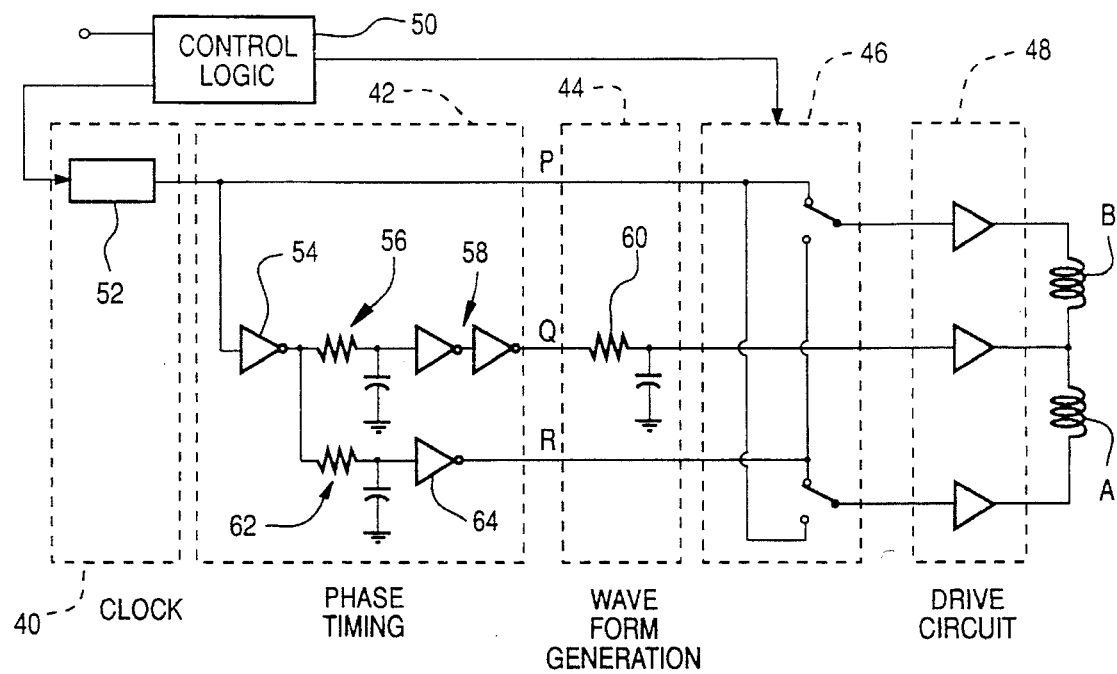
FIG. 6 is a circuit diagram of a control for the stepper motor according to the invention.

A circuit for controlling the coil energization for motor operation is shown in FIG. 6. There, a clock circuit 40 produces a square wave output which is applied to a phase timing circuit 42. Signals of different phases are output to a wave form generator 44 which sets the rise and fall times of the signals. A motor direction circuit 46 comprises a reversing switch which selectively applies the signals to opposite ends of the coils A and B. A driver circuit 48 provides current amplification to supply the coils. A control logic circuit 50 is coupled to the clock circuit 40 and to the direction circuit 46 to start and stop the clock and to operate the reversing switch to select direction. In the case of an instrument gauge the control circuit 50 may be a microprocessor or other control which receives an input signal representing a parameter to be displayed, determines the direction of pointer movement needed to attain the display value, and to turn on the clock to run the motor until the value is attained.

The clock circuit 40 has an oscillator 52 which outputs a square wave signal P to the phase timing circuit. The phase timing circuit 42 passes the signal P to one side of a coil B (for the switch position shown in block 46) and has an inverter 54 followed by a first RC delay circuit 56 and a buffer 58 (comprising two inverters in series) for applying a phase delayed signal Q to the other side of the coil B as well as to one side of the coil A (via an RC filter 60 in the wave form generator 44 for slew rate control). The output of the inverter 54 is also applied through another RC time delay circuit 62 and an inverter 64 to the other side of the coil A. The time constant of delay circuit 62 is twice as great as the time constant of delay circuit 56. Then each transition of the clock signal P causes a later transition in signal Q and a still later transition in signal R.

Figure 7:
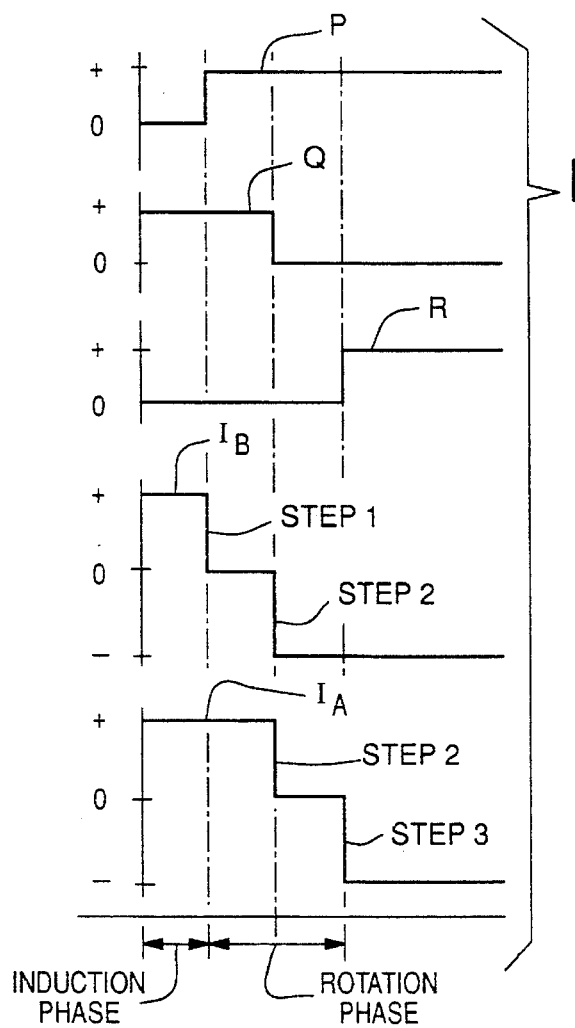
FIG. 7 is a timing diagram illustrating voltage signals developed by the circuit of FIG. 6 for the control of the stepper motor according to the invention.
Figure 8:
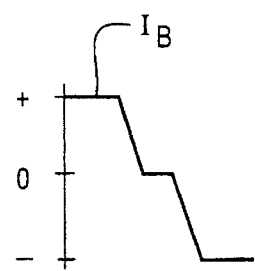
FIG. 8 is a typical drive current waveform output to the stepper motor by the circuit of FIG. 6.

As shown in the timing diagram of FIG. 7, the signals P and Q, applied across the coil B are at different voltages during the induction phase of motor operation to effect a coil current $I_B$. At the first transition (step 1 of rotation phase) that current goes to zero value because the signal P and Q voltages become equal. At the second transition (step 2) the current $I_B$ starts to flow again but opposite to its initial direction, as required. Similarly, the signals Q and R, applied across the coil A are at different voltages during the induction phase of motor operation to effect a coil current $I_A$. At the second transition that current stops because the signal Q and R voltage become equal. At the third transition (step 3) the current $I_A$ in coil A starts to flow again but opposite to its initial direction, as required. Thus the simple circuit of FIG. 6 provides the coil energization signal as needed to move the rotor by one tooth pitch for each clock pulse transition. The actual current waveform in each coil is determined by the wave form generator 44. The RC filter 60 in that circuit is chosen according to the motor application and particularly motor speed to enhance motor torque. The effect of the filter, as shown in FIG. 8, is to retard the rate of current change at each transition.

It will be seen then, that the stepper motor according to the invention is inexpensive since it requires no permanent magnets, can be very compact, and is operated by a simple control circuit.

The embodiments of the invention in which an exclusive property or privilege is claimed are defined as follows:

1. In a stepper motor system including a stepper motor having a ferromagnetic rotor with peripheral teeth magnetizable by an external field, and a plurality of ferromagnetic cores adjacent the rotor, each core having a coil, and a drive circuit for exciting the coils to establish external fields, the method of rotating the rotor comprising the steps of:

inducing poles in the rotor by exciting at least some of the coils to establish fields which momentarily magnetize the teeth, and then terminating the coil excitation;

then rotating the rotor by selectively exciting the coils while the tooth magnetization remains to produce a magnetic rotational force on the rotor; and repeating the inducing and rotating steps for continued rotation.

2. The invention as defined in claim 1 wherein the step of rotating the rotor includes:

exciting at least one coil for producing rotation to an intermediate stable position; and exciting at least another coil for producing rotation to another stable position.

3. The invention as defined in claim 2 wherein the repeating of an inducing step occurs when the rotor is advanced by one tooth pitch from the previous inducing step.

4. In a stepper motor system including a stepper motor having a ferromagnetic rotor with peripheral teeth, first and second electromagnets each having a winding and a core with two ends adjacent the rotor teeth, one end of each core being adjacent an end of the other coil, and a drive circuit for exciting the coils to establish external fields, the method of rotating the rotor comprising the steps of:

momentarily inducing poles in the rotor by exciting the coils to selectively magnetize the teeth and then terminating the coil excitation;

then rotating the rotor by dynamically exciting the coils to produce a magnetic rotational force on the rotor while the tooth magnetization remains; and repeating the inducing and rotating steps for continued rotation.

5. The invention as defined in claim 4 wherein:

the inducing step comprises establishing magnetic fields at the core ends for magnetizing teeth substantially opposite the ends; and the rotating step comprises:

turning off the first electromagnet and imposing a rotational force on the rotor by the field of the second electromagnet, then turning off the second electromagnet and imposing a rotational force by the field of the first electromagnet, and then turning on both electromagnets; whereby the rotor advances by one tooth pitch.

6. The invention as defined in claim 4 wherein:

the inducing step comprises energizing both electromagnets for magnetizing teeth substantially opposite the core ends; and the rotating step comprises:

turning off the first electromagnet after magnetizing the teeth and imposing a rotational force on the rotor by the field of the second electromagnet, then turning off the second electromagnet and energizing the first electromagnet to impose a rotational force by the field of the first electromagnet, and finally energizing the second electromagnet to impose a rotational force by the fields of both electromagnets.

7. The invention as defined in claim 6 wherein during the inducing step each electromagnet is energized in one polarity, and during the rotating step, the step of energizing each electromagnet comprises energizing in the opposite polarity.

8. The invention as defined in claim 6 wherein the step of finally energizing the second electromagnet moves the rotor to a stable position and induces poles in the rotor to carry out a subsequent inducing step for continued motor rotation.

9. The invention as defined in claim 4 wherein:

the inducing step comprises energizing each electromagnet at a given polarity for magnetizing the rotor teeth; and upon the inducing step of each repeating step each electromagnet is energized at a polarity opposite that of the previous inducing step.

10. A stepper motor system including a stepper motor and a control circuit comprising:

a rotor of ferromagnetic material having an array of teeth;

a pair of electromagnets adjacent the rotor, the electromagnets including a core of ferromagnetic material wound with a coil and having magnetic fields of sufficient strength to induce poles in the teeth, wherein the rate of change of magnetic strength in the core material is greater than that of the rotor material so that the induced poles maintain sufficient magnetism for rotor movement while the core polarities are successively reversed; and a circuit for energizing the electromagnets to induce a pole in each tooth and subsequently to exert magnetic force on the poles to rotate the rotor.

11. The invention as defined in claim 10 wherein the teeth move in a path upon rotor rotation; and each electromagnet comprises a core wound with a coil, the core having ends adjacent the path of the teeth to define magnetic fields for selectively inducing poles in the teeth.

12. The invention as defined in claim 10 wherein the teeth move in a path upon rotor rotation; and each electromagnet comprises a core wound with a coil, the core having ends adjacent the path of the teeth and the ends being spaced so that when one end is substantially aligned with a tooth the other end is offset from an adjacent tooth sufficiently for its field to exert a rotational force on the rotor.

13. The invention as defined in claim 12 wherein the spacing of the teeth is greater than the spacing of the core ends.

14. The invention as defined in claim 12 wherein the spacing of the teeth is less than the spacing of the core ends.

15. The invention as defined in claim 10 wherein the teeth move in a path upon rotor rotation;

each electromagnet comprises a core wound with a coil, the core having ends adjacent the path of the teeth to define magnetic fields for selectively inducing poles in the teeth;

the cores of the electromagnets being partially joined to define a common core end of one polarity and having adjacent core ends of opposite polarity on either side of the common core end.

16. The invention as defined in claim 10 wherein the circuit includes:

means for energizing the coils simultaneously for inducing poles in the rotor; and means for energizing the coils individually and sequentially for exerting magnetic force on the poles.

* * * * *